April 18, 1967     H. VIVEIROS     3,314,186
FISHLINE CASTING APPARATUS
Filed Dec. 8, 1964
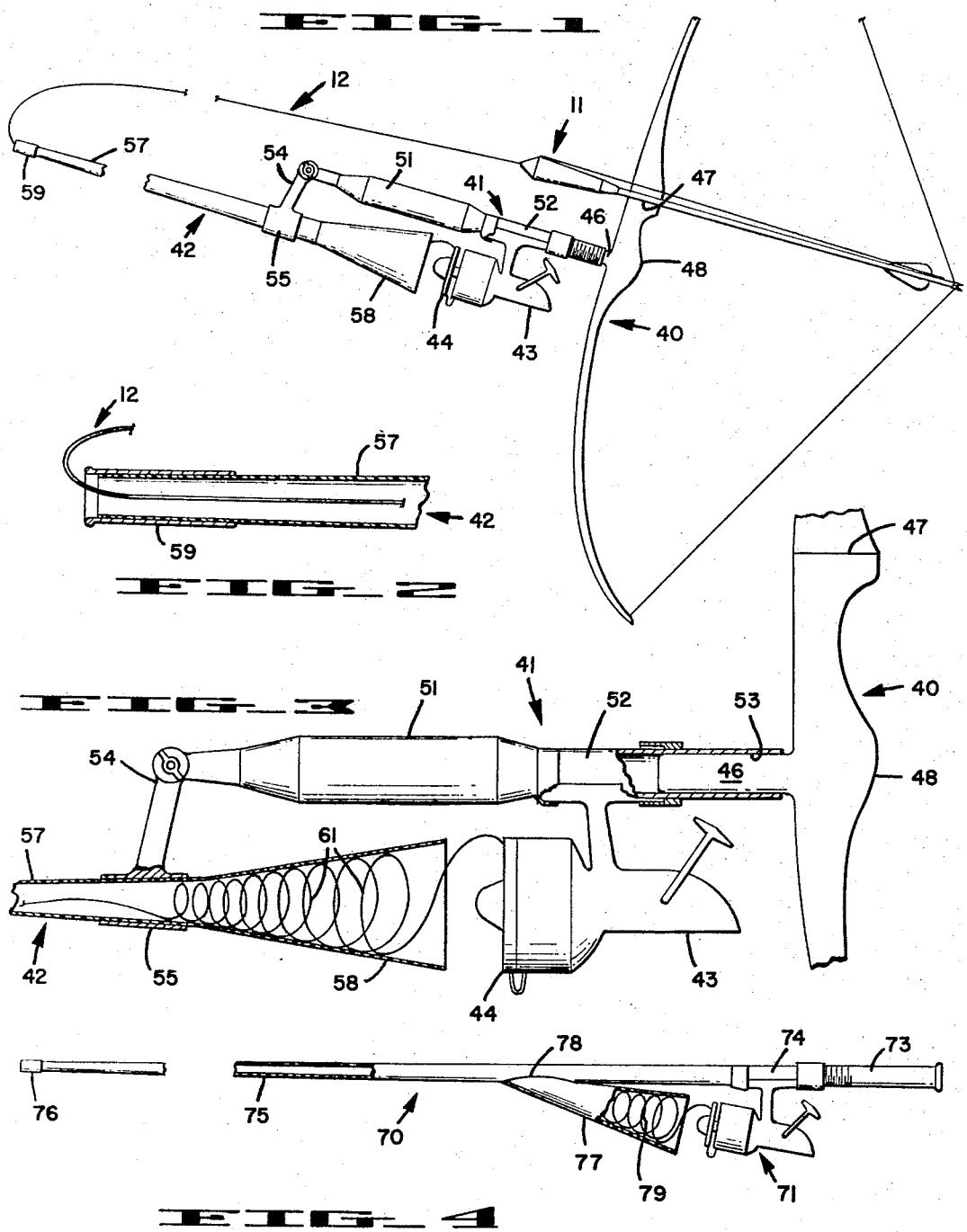
INVENTOR.
HENRY VIVEIROS
BY *Henry Viveiros*

United States Patent Office 3,314,186
Patented Apr. 18, 1967

3,314,186
FISHLINE CASTING APPARATUS
Henry Viveiros, 1983 Camden Ave.,
San Jose, Calif. 95124
Filed Dec. 8, 1964, Ser. No. 416,807
2 Claims. (Cl. 43—18)

The principal object of this invention is the provision of arrow propelling apparatus which is removably connected to a hollow guide fishing rod that has the function of shooting out and retrieving the device of my copending application filed Oct. 26, 1964, Ser. No. 407,281, titled Lure Chamber Fishing Arrow and now Patent No. 3,292,296. The lure chamber fishing arrow of my prior application is shot with the bow outwardly into the water, and said arrow is retrieved with the hollow guide fishing rod and reel. All the necessary fishing equipment is with the user for the convenience that is essential for a more efficient method of catching fish.

An object of this invention is to provide an apparatus of the character described which may be used in confined fishing areas. Areas such as docks or wharfs are used frequently by fishermen. It is difficult to cast with conventional surf casting equipment in such areas and it becomes hazardous to other personnel in that area. The possibility of hooking or injuring someone is the reason that casting is impossible to perform in such areas. Another confined fishing area is narrow rock formations that surf casting equipment can not be use because a large area is needed to swing the fishing rod. Still another confined fishing area is a fishing party boat that is popular with fishermen, casting is impossible in this situation when the boat is anchored and fishermen are in the boat fishing on every side.

A further object of the present invention is to provide an apparatus of the character described which may be used to achieve greater distance than the conventional surf casting rod placed into a sand spike. The rod and reel, bow and arrow is with the user rather than with the rod and reel placed some distance away from the user, thus, added distance is gained.

Another object of the invention is to provide an apparatus of the character described, which enables the angler to remove the hollow guide fishing rod from a stud on a bow to allow the rod and reel to be used independently from the bow for the purpose of retrieving the arrow.

Still another object of the invention is to provide a hollow guide fishing rod of the character described which eliminates the use of spaced line mounting guides. Mounting guides for a line are the cause of weak spots along the rod shaft of a solid conventional type fishing rod. In the present invention the fishing line distributes a stress that is evenly divided along the shaft of the hollow guide fishing rod. A more flexible rod can be manufactured with better tip-action. The present invention incorporates a rod funnel which decreases the loops coming from the reel in an equal but abrupt manner, thus, an even flow of the fishing line is maintained throughout the rod shaft.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

There are included as a part of the specification drawings illustrative of the invention and briefly described as follows:

FIGURE 1 illustrates a side elevation of the rod and reel bow and arrow fishing device.

FIGURE 2 is an enlarged fragmentary sectional view of the extreme tip of the hollow rod.

FIGURE 3 is an enlarged fragmentary view partially in section.

FIGURE 4 is a fragmentary side elevation of a modified version.

In the following specification the hollow guide fishing rod shall be referred to as just rod, and the reel seat stud bow shall be referred to as just bow, and the lure chamber fishing arrow shall be referred to as just arrow, and said rod, bow, arrow and reel shall be referred to as just device for brevity.

FIGURE 1 illustrates the apparatus in an elevated position, with the rod 42 attached to the bow 40. The fishing line 12 is strung from the spool 44, through the cavity of the rod funnel 58, rod shaft 57 and rod tip 59. The line 12 is strung through the arrow 11, with the proper hooks, bait, lure and sinkers (not shown). The bow 40 is held by the grip 48, and the arrow 11 is placed on the arrow rest 47, and the arrow 11 is shot with the bow 40 outwardly into the water.

FIG. 2 illustrates the extreme tip of the rod 42. The rod tip 59 is attached to the rod shaft 57, with the fishing line 12 in the cavity of the rod 42. The rod tip 59 prevents the rod shaft 57 from disintegrating, due to the fishing line 12 causing excessive wear in that section of the rod 42, when the fishing line 12 is being retrieved. The rod tip 59 is composed of a very hard noncorrosive type of material, and has high wearing characteristics.

FIGURE 3 illustrates an enlargement of the device in partial section. The rod holder 55 is attached to the rod shaft 57 and is held rigid by frictional contact; the same is true of the reel seat 52 attached to the reel seat stud 46. By means of the reel seat opening 53 it is also held rigid by frictional contact. The reel 43 is attached to the reel seat 52 in the conventional method, by inserting the reel in the reel seat clamps and the nut is tightened. The adjustable arm 54 is adjusted to align the center of the rod funnel 58 with the center of the spool 44. The adjustable arm 54 is tightened by a wing nut to hold the rod 42 in position. The hand grip 51 is held when the adjustable rod handle 41 is removed from the bow 40 to retrieve the arrow. The rod funnel 58 decreases the loops 61 coming from the spool 44 in an equal and instantaneous manner, thus, the fishing line 12 flows through the cavity of the rod shaft 57 evenly.

FIGURE 4 illustrates a modified version of the hollow guide fishing rod 70. The rod shaft 75 has a cavity the length of the rod 70. A reel seat 74 is assembled at the rearward section of the rod to accommodate a reel 71 ahead of hand grip 73. An aperture in the rod shaft 75 at the funnel intersection 78 permits the loops 79 to go through the cavity of the rod shaft 75 and rod tip 76. The rod funnel 77 is an integral part of the rod shaft 75 and is assembled at intersection 78. The opening of the rod funnel 77 is close to the reel 71 to decrease the loops 79, coming from the reel 71 when the rod 70 is used by the user when casting. The angle of the rod funnel 77 and reel 71 are the same in relation to the rod 70 to align the center of the rod funnel 77 with the center of the reel 71. A rod tip 76 is assembled at the end of the rod shaft 75 to decrease wearing of the rod 70 in that section when the fishing line (representative by the loops 79) is pulled into the rod shaft 75. A weight (not shown) smaller than the diameter of the rod tip 76 is attached to the fishing line and dropped into the rod funnel 77, through the rod shaft 75, and rod tip 76. The end of the fishing line is attached to a conventional type fishing jig (not shown) with hooks, sinkers, swivels, bait or lure and cast outwardly into the water.

While the salient features of these inventions have been described in detail with respect to certain embodiments thereof, it will of course be apparent that certain modifications may be made within the spirit and scope of these inventions, and it is not desired therefore to limit the inventions to the exact details shown except insofar as they may be defined in the following claims.

What is claimed is:

1. A fishline casting apparatus comprising a tubular rod section provided with a line guide tip at its forward end a cone-shaped line guide at its rearward end, an arm projecting outwardly from said rod section adjacent said cone-shaped line guide, a handle having a forward end pivotally and adjustably connected to the outer end of said arm and a rear tubular end, said handle including a forward handgrip portion and a rearward reel mount, an arrow propelling device provided with a forwardly extending stud for frictionally receiving the rear tubular end of said handle, and a reel connected to said reel mount in such a manner that said handle may be pivotally adjusted relative to said rod section to position the axis of the reel spool in alignment with the axis of said cone-shaped line guide, whereby a fish line on said reel may be threaded through said cone-shaped line guide, said rod section and said forward line guide tip and connected to an arrow adapted to be propelled by said arrow propelling device.

2. A fishline casting apparatus comprising a tubular rod section provided with a line guide tip at its forward end, a cone-shaped line guide at its rearward end, said cone-shaped line guide being mounted on the rearward end of said rod in communication with the interior thereof in such a manner that the axis of said rod in relation to the axis of said cone-shaped line guide defines an acute angle, said cone-shaped line guide being substantially uniformly tapered throughout its length and to its mounting end, a handle having a forward hand grip portion and a rearward reel mount connected to said rod, and an open face spinning reel connected to said reel mount in such a manner that the reel spool axis aligns with the axis of said cone-shaped line guide, said handle having a rear grip connected to said reel mount.

References Cited by the Examiner

UNITED STATES PATENTS

| 2,324,429 | 7/1943 | Rondelli | 43—18 |
| 2,334,646 | 11/1943 | Price | 43—18 |
| 2,729,012 | 1/1956 | Lee | 43—18 |
| 2,952,091 | 9/1960 | Blanchard | 43—19 |
| 3,052,055 | 9/1962 | Hayward | 43—19 |
| 3,059,370 | 10/1962 | Moore | 43—19 |
| 3,084,467 | 4/1963 | Bromwell | 43—19 |
| 3,129,525 | 4/1964 | Lewis | 43—19 |
| 3,222,811 | 12/1965 | Henson | 43—18 |

SAMUEL KOREN, *Primary Examiner.*

WARNER H. CAMP, ALDRICH F. MEDBERY,
*Examiners.*